United States Patent
Mammen et al.

(10) Patent No.: US 7,277,437 B1
(45) Date of Patent: Oct. 2, 2007

(54) PACKET CLASSIFICATION METHOD

(75) Inventors: Neil Mammen, San Jose, CA (US);
Mammen Thomas, San Jose, CA (US);
Sanjay Agarwal, San Jose, CA (US);
M. Varghese Ninan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 892 days.

(21) Appl. No.: 10/153,137

(22) Filed: May 20, 2002

(51) Int. Cl.
*H04L 12/26* (2006.01)
*H04L 12/56* (2006.01)
*H04J 1/16* (2006.01)
*G08C 15/00* (2006.01)
*G06F 11/00* (2006.01)

(52) U.S. Cl. .............. 370/392; 370/229; 370/389; 709/244

(58) Field of Classification Search ........ 370/225–235, 370/242–252, 389–392, 395–412; 709/229–236, 709/238–250
See application file for complete search history.

(56) References Cited

U.S. PATENT DOCUMENTS

| | | | |
|---|---|---|---|
| 6,163,539 A * | 12/2000 | Alexander et al. ......... 370/392 |
| 6,389,468 B1 * | 5/2002 | Muller et al. ............... 709/226 |
| 6,915,480 B2 * | 7/2005 | Calle et al. ................. 714/799 |
| 6,985,964 B1 * | 1/2006 | Petersen et al. ............ 709/244 |
| 7,002,965 B1 * | 2/2006 | Cheriton ................ 370/395.32 |
| 2002/0126672 A1 * | 9/2002 | Chow et al. ................ 370/392 |
| 2003/0053460 A1 * | 3/2003 | Suda et al. ................. 370/392 |
| 2003/0063348 A1 * | 4/2003 | Posey, Jr. ................... 359/139 |
| 2003/0099194 A1 * | 5/2003 | Lee et al. ................... 370/229 |
| 2003/0103507 A1 * | 6/2003 | Lynch et al. ............... 370/392 |
| 2003/0112802 A1 * | 6/2003 | Ono et al. .................. 370/389 |
| 2003/0189932 A1 * | 10/2003 | Ishikawa et al. ........... 370/392 |
| 2003/0214948 A1 * | 11/2003 | Jin et al. .................... 370/392 |

* cited by examiner

*Primary Examiner*—Man U. Phan
(74) *Attorney, Agent, or Firm*—Martine Penilla & Gencarella LLP

(57) ABSTRACT

According to one embodiment, a network hardware machine is disclosed. The network hardware machine includes a central processing unit (CPU) that processes data packets received at the network hardware machine, and a classifier, coupled to the CPU, that classifies the packets prior to the packets being received at the CPU.

13 Claims, 3 Drawing Sheets

PACKET CLASSIFICATION METHOD

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to networking systems; more particularly, the present invention relates to the classification of network traffic received at a router.

BACKGROUND

A router is usually designed to perform one or more basic networking tasks. One basic networking task is the classification of network data traffic packets received at the router. Packet classification involves determining a received packet's flow based on a source and/or destination address, and the flow label or some higher level information, such as transport ports.

Typically, a packet received at a router is forwarded to a processor and is assigned to a packet editor. The packet editor runs multiple "jump condition" instructions until it finds a match with a particular set of bits in the packet header. The processor subsequently extracts a classification key and a forwarding key from the packet. Using the result of the classification, the packet is typically stamped with a class of service. In addition, as a result of the forwarding key, the packet headers are changed to reflect the new forwarding information.

One problem with typical packet processing is that when the packet is received at the processor the packet header is matched against many compare statements in order to find which routine the program is to jump to in order to process this unique packet. Consequently, if there are more than one thousand types of packets to process, program space for one thousand unique comparison instructions is typically required and a binary search with a minimum of $\log_2 (1000)$ comparisons and as many jump statements will be required.

Moreover, each comparison may take up to two to three processor cycles to process and each jump statement may take two processor cycles to process. As a result, having to compare numerous packet types may require significant waiting time before a packet is processed or require significant processing power to process all the packets at the rate they are received.

Another problem with typical packet processing occurs if a new service is to be provided for the router. To add new service to an exemplary router, the router memory has to be reprogrammed and modified. As a result, the router has to be shut down for the new service to be added. It is not desirable to shut down an active router that is currently serving customers.

Further, once the router is restarted, the new service has to be tested along with all the old services to ensure that no errors have been induced into the old services. If the new program has, for example, over one million services in total, it is not efficient to take the time to send multiple packets of each of the one million services to test all aspects of the new program.

SUMMARY

According to one embodiment, a network hardware machine is disclosed. The network hardware machine includes a central processing unit (CPU) that processes data packets received at the network hardware machine, and a classifier, coupled to the CPU, that classifies the packets prior to the packets being received at the CPU.

According to a further embodiment, the network hardware machine includes a pre-classifier coupled to the classifier, a forwarding engine coupled to the pre-classifier and a memory device coupled to the classifier and the forwarding engine. The pre-classifier extracts a classifier key and a forwarding key from packets received at the network hardware machine. The forwarding engine determines where the packet is to be transmitted.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method of classifying network packets is described herein. According to one embodiment a packet is received at a networking hardware machine. Subsequently, a classification key and a forwarding key are extracted from the packet at a pre-classifier. The classification and forwarding keys are received at a classifier and forwarding engine, respectively. An index corresponding to the packet is received at a memory from the classifier. The memory transmits a program corresponding to the packet to a processor. Finally, the packet is edited at a packet editor within CPU.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
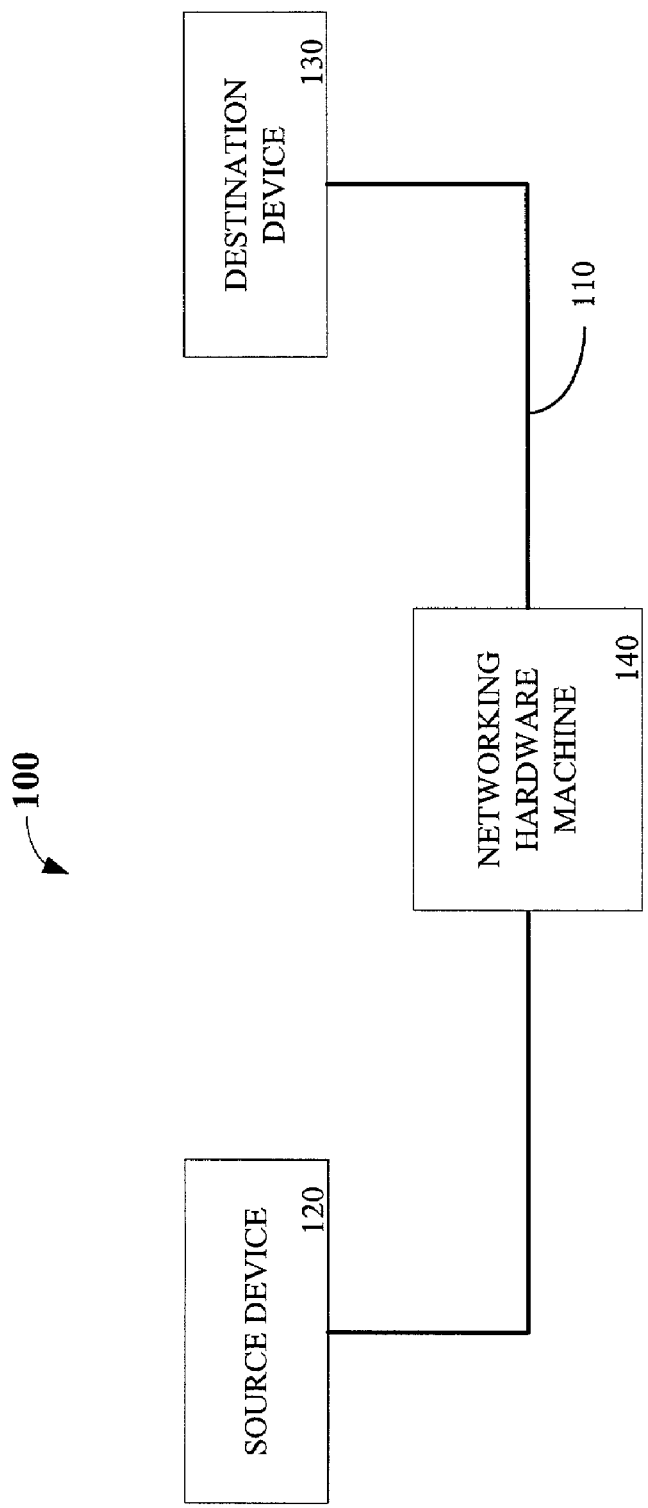
FIG. 1 illustrates one embodiment of a network.

FIG. 1 illustrates one embodiment of a network 100. Network 100 includes at least one communication link 110, at least one source device 120, at least one destination device 130, and at least one networking hardware machine 140. Communication link 110 may comprise any form of physical media layer, such as Ethernet, FDDI, or HDLC serial link.

Networking hardware machine 140 receives data packets from source device 120 and forwards the packets to destination device 130. In one embodiment, networking hardware machine 140 performs one or more basic networking tasks. For example, networking hardware machine 140 includes processing, classification, forwarding engine, policing and other types of components.

According to one embodiment, networking hardware machine 140 is a router. However, in other embodiments, networking hardware machine 140 may be a card in a router, or a switch, or other device, that determines the next destination device 130 to which a data packet should be forwarded.

Figure 2:
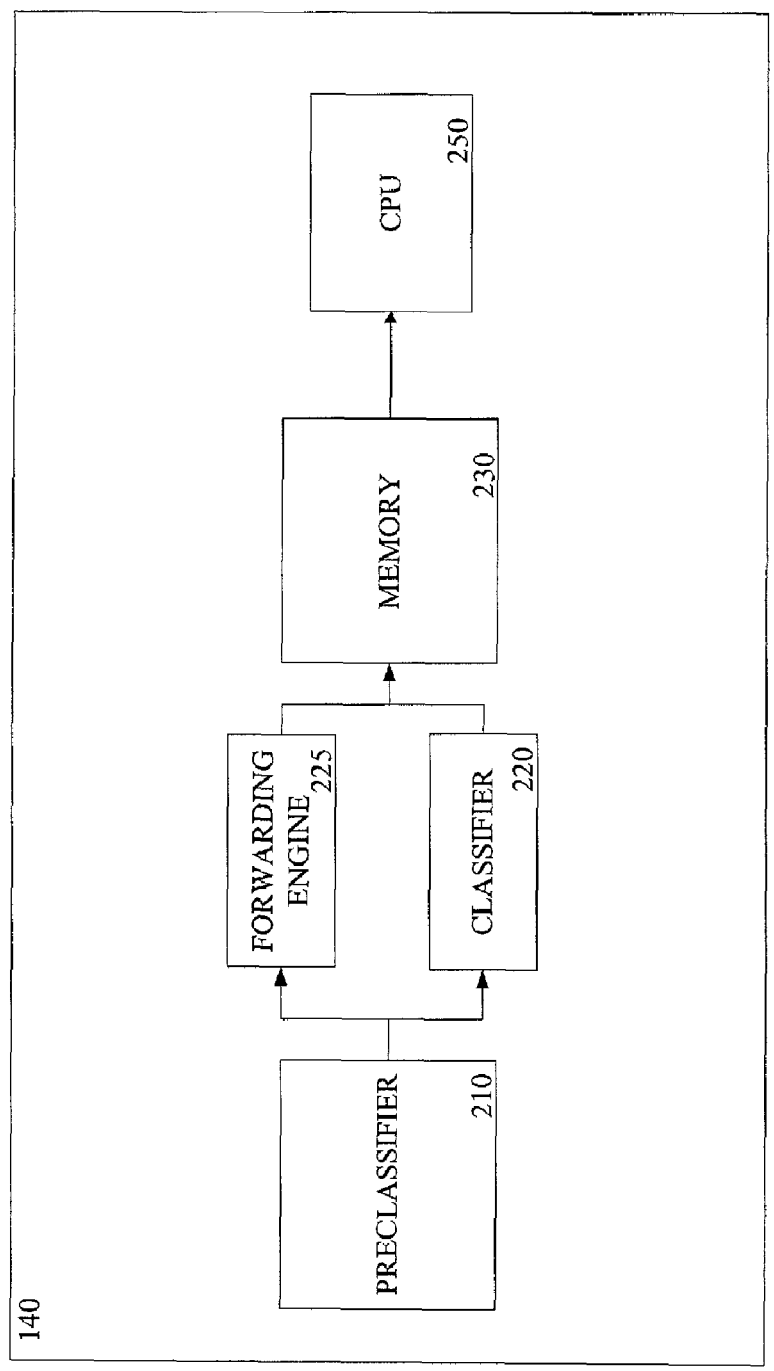
FIG. 2 illustrates one embodiment of a networking hardware machine.

FIG. 2 illustrates one embodiment of a networking hardware machine 140. Networking hardware machine 140 includes a pre-classifier 210, a classifier 220, a forwarding engine 225, a memory 230 and a central processing unit (CPU) 250. In one embodiment, the components of networking hardware machine 140 are all included within a single application specific integrated circuit (ASIC). However, one of ordinary skill in the art will appreciate that the components of networking hardware machine 140 may be implemented on two or more separate integrated circuits.

Pre-classifier 210 extracts a classification key and a forwarding key from packets received at networking hardware machine 140. Classifier 220 receives the classification key from pre-classifier 210. Classifier 220 determines a flow index for the received packet based upon a source and/or destination address. In particular, classifier 220 determines the priority of the packet by indicating an index to a location in memory 230 that contains the priority of the packet encoded within it.

In addition, classifier 220, in a similar manner, provides an index to memory 230 that contains instructions to CPU 250 as to how the packet is to be edited. According to one embodiment, classifier 220 is a content addressable memory (CAM) which outputs an index. Nevertheless, in other embodiments, classifier 220 may be implemented using other types of memory devices including fast channel RAMs (FCRAMs) without departing from the scope of the invention.

Forwarding engine 225 receives the forwarding key from pre-classifier 210. Forwarding engine 225 provides for the reception, processing and forwarding of packets. Particularly, forwarding engine 225 looks up the forwarding key in a routing table to find a second index to memory 230 that will provide the instructions for the route for the packet. Forwarding engine 225 also indicates through the index and memory 230 a code which indicates to CPU 250 how the packet is to be edited.

Memory 230 receives an index generated by classifier 220 and the second index generated by forwarding engine 225. Each index is a pointer to the location of a program stored in memory 230. Memory 230 uses the two indexes to output two programs corresponding to the packet. Memory 230 transmits the program to CPU 250 for packet editing.

CPU 250 is a general purpose programmed computer that manages the overall operation of a networking hardware machine 140 in cooperation with other components of network 100 of which the respective networking hardware machine 140 is a part. In one embodiment, CPU 250 includes a multitude of packet editors (not shown) that process received packets.

Figure 3:
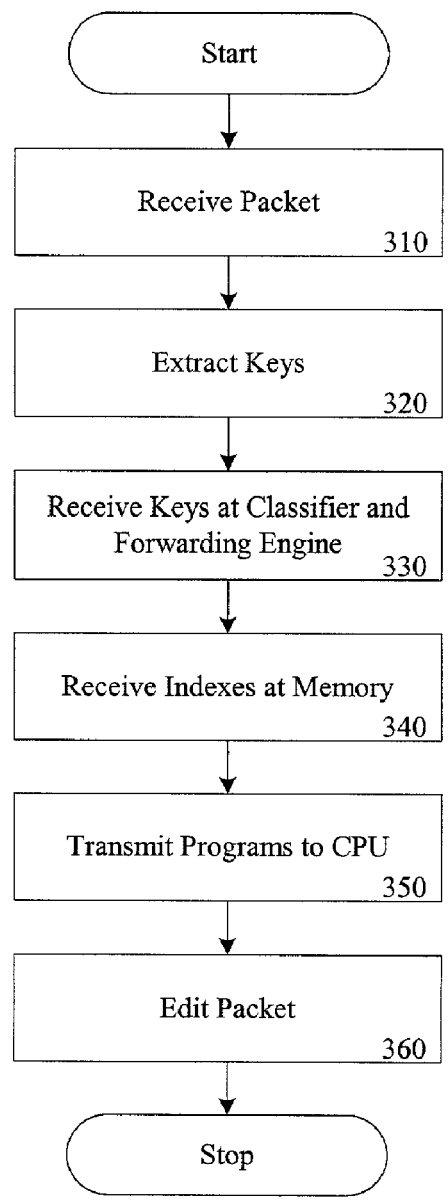
FIG. 3 is a flow diagram of one embodiment for the operation of a packet classification and editing process.

FIG. 3 is a flow diagram of one embodiment for the operation of a packet classification and editing process. At processing block 310, a packet is received at networking hardware machine 140. At processing block 320, a classification key and a forwarding key are extracted from the packet at pre-classifier 210.

At processing block 330, the classification and forwarding keys are received at classifier 220 and forwarding engine 225, respectively. As described above, classifier 220 determines the priority of the packet, while forwarding engine 225 determines where the packet is to be transmitted.

At processing block 340, two indexes corresponding to the packet is received by memory 230 from classifier 220 and forwarding engine 225. At processing block 350, memory 230 transmits a program corresponding to the packet to CPU 250. At processing block 360, the packet is edited at a packet editor within CPU 350.

Removing the pre-classification and classification functions from the CPU enables packet editors within the CPU to only have to perform limited tasks, and thus operate more efficiently. No waiting at a packet editor is required since all of the data is available to a packet editor when it begins to execute instructions.

In addition, multiple cycles are not wasted in the CPU as it parses though multiple compare statements when it receives a new packet before it can then jump to the appropriate processing routine. Moreover, if it is necessary to provide additional services for the networking hardware machine, a new line in the pre-classifier may be added, as well as another location in memory 230. No other component needs to be modified. Consequently, it is not necessary to shut down the networking hardware machine upon adding new services. This provides "Hitless Software Upgrades."

Further, if there are errors in a particular packet program, the problems will only be observable whenever the particular type of packet is received, no other packets will be affected. Therefore, the system may be debugged while in operation.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A network hardware machine, comprising:
    a central process unit (CPU) that processes data packets received at the network hardware machine;
    a classifier, coupled to the CPU, that classifies the packets prior to the packets being received at the CPU, wherein the classifier provides an index to a memory device external to the classifier and the CPU, the index containing instructions for the CPU as to how the packet is to be edited;
    a pre-classifier, coupled to the classifier, that extracts a classifier key and a forwarding key from packets received at the network hardware machine;
    a forwarding engine, coupled to the pre-classifier, that determines where the packet is to be transmitted; and
    the memory device coupled to the classifier and the forwarding engine.

2. The network hardware machine of claim 1 wherein the classifier and the forwarding engine indicate how the packet is to be processed at the CPU.

3. The network hardware machine of claim 2 wherein the classifier determines a flow index for the received packets based upon a source address and a destination address.

4. The network hardware machine of claim 3 wherein classifier determines the priority of the packets by indicating an index to a location in the memory device that contains the priority of the packet.

5. The network hardware machine of claim 1 wherein the classifier is a content addressable memory (CAM) which outputs an index.

6. The network hardware machine of claim 1 wherein the classifier is a fast cycle random access memory (FCRAM) which outputs an index.

7. The network hardware machine of claim 2 wherein the forwarding engine looks up a forwarding key to find an index to the memory device that will provide the instructions for the route for the packet.

8. The network hardware machine of claim 7 wherein the index provides instructions on how to route the packets.

9. The network hardware machine of claim 7 wherein the forwarding engine provides a code which indicates how the CPU is to edit the packets.

10. The network hardware machine of claim 1 wherein the CPU includes one or more packet editors.

11. A method, comprising:
    receiving a data packet at a network hardware machine;
    extracting a classifier key at a pre-classifier;
    classifying the packet at a classifier; and
    processing the data packet at a central processing unit (CPU), wherein the classifier provides an index to a memory device external to the classifier and the CPU, the index containing instructions for the CPU to process the packet and wherein the classifying of the packet further including,
    determining a flow index for the packet based upon a source address and a destination address;
    determining the priority of the packet by indicating an index to a location in the memory device that includes the priority of the packet; and
    providing an index to the memory device that includes instructions to the CPU as to how the packet is to be edited.

12. The method of claim 11 further comprising:
    extracting a forwarding key at the pre-classifier; and
    determining the destination of the packet at a forwarding engine based upon the forwarding key.

13. The method of claim 12 further comprising the forwarding engine finding an index to the memory device that provides instructions for the route for the packet.

* * * * *